United States Patent
Tan (10) Patent No.: US 8,072,339 B2
(45) Date of Patent: Dec. 6, 2011

(54) REMOTE CONTROL WITH TEMPERATURE SENSOR FOR AIR CONDITIONER

(76) Inventor: Hui Tan, Shenzhen (CN)

( * ) Notice: Subject to any disclaimer, the term of this patent is extended or adjusted under 35 U.S.C. 154(b) by 350 days.

(21) Appl. No.: 12/411,404

(22) Filed: Mar. 26, 2009

(65) Prior Publication Data

US 2010/0245094 A1  Sep. 30, 2010

(51) Int. Cl.
*G08B 17/00* (2006.01)
(52) U.S. Cl. ............ 340/586; 700/275; 236/44 R
(58) Field of Classification Search ............ 340/584, 340/586; 700/275, 276; 236/44 R, 51
See application file for complete search history.

(56) References Cited

U.S. PATENT DOCUMENTS

| | | | |
|---|---|---|---|
| 5,621,662 A * | 4/1997 | Humphries et al. | 700/276 |
| 5,798,681 A * | 8/1998 | Chang | 336/83 |
| 2007/0114295 A1* | 5/2007 | Jenkins | 236/51 |
| 2007/0162858 A1* | 7/2007 | Hurley et al. | 715/732 |
| 2007/0224394 A1* | 9/2007 | Takeyama | 428/141 |
| 2007/0293208 A1* | 12/2007 | Loh et al. | 455/419 |
| 2009/0096656 A1* | 4/2009 | Smith | 341/176 |
| 2009/0140059 A1* | 6/2009 | Barton et al. | 236/51 |

* cited by examiner

*Primary Examiner* — George Bugg
*Assistant Examiner* — Edny Labbees (57) ABSTRACT

A remote control system includes an RC comprising a first processor, a first RF unit, and a temperature sensor; a receiver on an air conditioner and comprising a second processor and an IR receiver; and a retransmission device proximate the air conditioner and comprising a third processor, a second RF unit, and an IR unit. The first processor compares temperature measured by the temperature sensor with a set temperature of the air conditioner, the first processor sends a temperature adjustment instruction to the first RF unit if the measured temperature is not within a predetermined range of the set temperature, the first RF unit transmits the instruction to the second RF unit via RF signals, the third processor processes received RF signals into IR signals, the IR unit transmits received IR signals to the IR receiver, and the second processor processes received IR signals into a temperature adjustment instruction.

1 Claim, 7 Drawing Sheets

REMOTE CONTROL WITH TEMPERATURE SENSOR FOR AIR CONDITIONER

BACKGROUND OF THE INVENTION

1. Field of Invention

The invention relates to remote controls and more particularly to a remote control having a temperature sensor for an air conditioner such that people in the room may feel an increased degree of comfort.

2. Description of Related Art

Typically, most of remote controls (RCs) communicate to their respective devices via IR (infrared) signals. Further, a transmission unit is provided in the RC and a receiver is provided in the device to be controlled.

A typical RC comprises, in addition to the transmission unit, a keypad and associated circuitry, and a printed circuit board (PCB). The transmission unit comprises an LED (light-emitting diode) for emitting IR rays. The device to be controlled comprises, in addition to the receiver, a decoding circuit which is adapted to amplify, filter, and decode the received control signals for further processing.

However, a couple of drawbacks of the conventional RCs have been found. First, a person has to point an RC at an appliance (e.g., air conditioner) to be controlled due to the nature of IR transmission. Second, an effective distance between the RC and the appliance to be controlled is typically less than 10 meters. It is thus typical that a person walks to a position close the appliance and points the RC at the appliance in operation. This is very inconvenient in use.

U.S. Pat. No. 7,068,181 discloses a programmable appliance remote control. Thus, continuing improvements in the exploitation of remote control are constantly being sought.

SUMMARY OF THE INVENTION

It is therefore one object of the invention to provide a remote control having a temperature sensor for an air conditioner such that people in the room may feel an increased degree of comfort.

The above and other objects, features and advantages of the invention will become apparent from the following detailed description taken with the accompanying drawings.

DETAILED DESCRIPTION OF THE INVENTION

Referring to FIGS. 1 to 5, a remote control system for an air conditioner in accordance with a first preferred embodiment of the invention comprises the following components as discussed in detail below.

Figure 1:
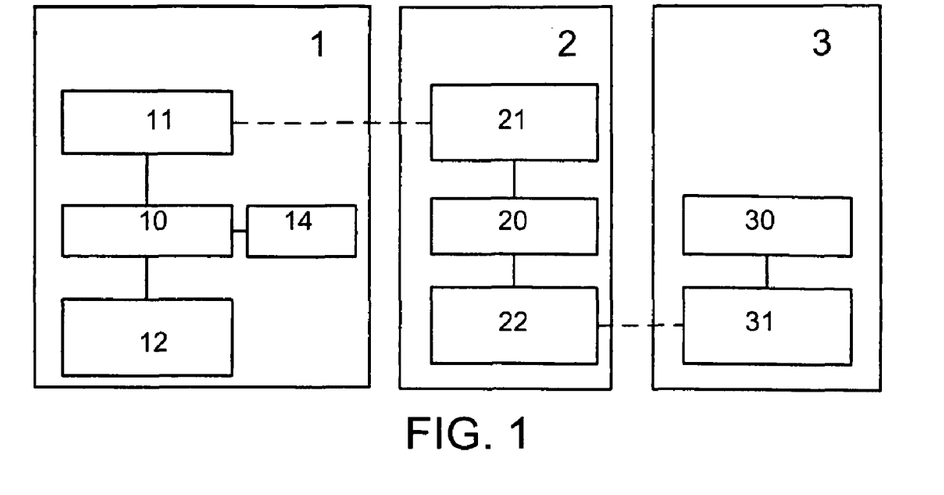
FIG. 1 is a block diagram of a remote control system for an air conditioner according to a first preferred embodiment of the invention.

A remote control (RC) 1 comprises a first processor 10, a first RF unit 11, a keypad 12, a temperature sensor 13 (see FIG. 4), and a liquid crystal display (LCD) display 14. The RC 1 is adapted to be held by a person. A retransmission device 2 comprises a third processor 20, a second RF unit 21, and an IR unit 22. The retransmission device 2 is mounted in a position proximate an air conditioner. A receiver 3 comprises a second processor 30 and an IR receiver 31. The receiver 3 is mounted on the front surface of the air conditioner. The first RF unit 11 is adapted to communicate to the second RF unit 21 via radio frequency (RF) signals. The IR unit 22 is adapted to communicate to the IR receiver 31 via IR signals.

In use, a person may press a key on the keypad 12 of the RC 1 to enable the first processor 10 thereof. And in turn, the first processor 10 commands the first RF unit 11 to transmit RF remote control signals to the second RF unit 21. And in turn, the third processor 20 receives the RF signals via the second RF unit 21 and processes same into IR remote control signals. And in turn, the IR signals are transmitted to the IR receiver 31 via the IR unit 22. Finally, the second processor 30 receives the IR signals via the IR receiver 31 and processes same into a signal for instructing the air conditioner to perform a desired operation.

The RF signal communication between the first RF unit 11 and the second RF unit 21 has the following advantages. A person may hold the RC 1 at an increased angle with respect to the retransmission device 2, i.e., not required to point the RC 1 at the retransmission device 2 in use. Further, a distance between the RC 1 and the retransmission device 2 can be increased significantly. As a result, a person may easily effectively operate the RC 1. Moreover, there is no need to modify the existing air conditioner since the retransmission device 2 is disposed externally of the air conditioner.

Figure 2:
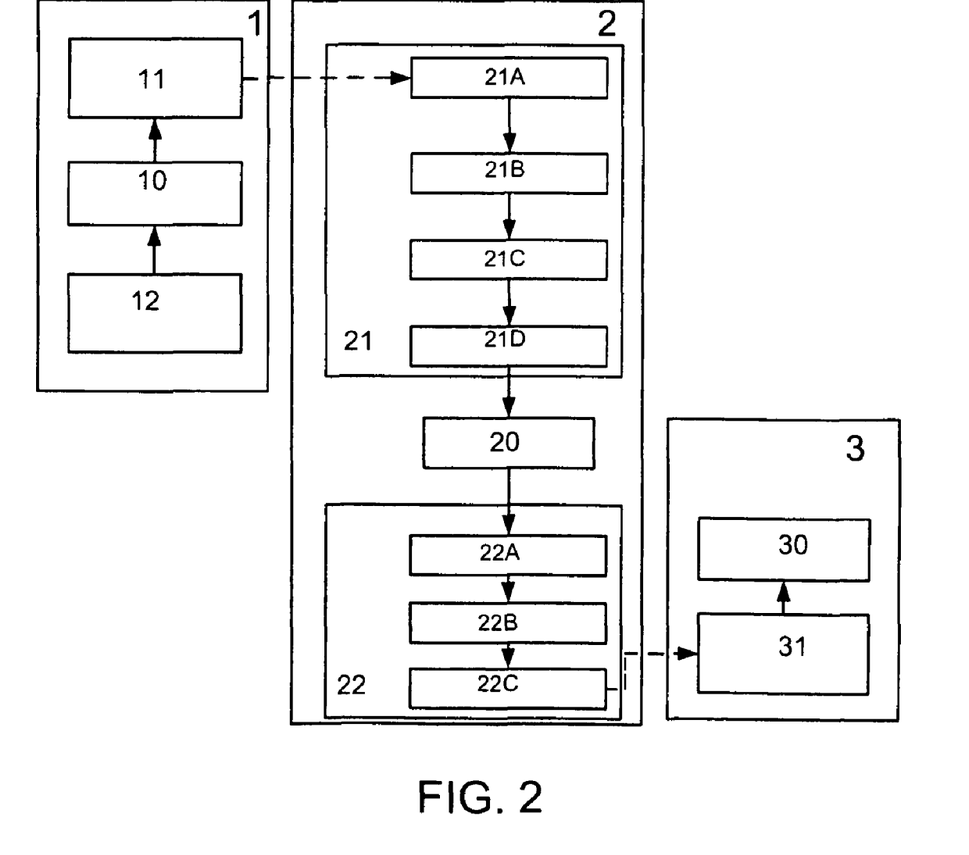
FIG. 2 is another block diagram of FIG. 1 with a first configuration of the retransmission device of the remote control system being shown in detail.

Referring to FIG. 2 specifically, a first configuration of the retransmission device 2 is shown. The second RF unit 21 comprises an antenna 21A for receiving RF signals transmitted from the first RF unit 11, an low noise amplifier 21B for amplifying the received RF signals, a down converter 21C for processing the RF signals, and a demodulator 21D for demodulating the converted RF signals. The third processor 20 processes the demodulated RF signals into IR signals. The IR unit 22 comprises an encoder 22A for encoding the IR signals into one of a plurality of forms such as one including a guide code, a user code, and a control code, an amplifier 22B for amplifying the encoded IR signals, and an IR LED (light Emitting Diode) 22C for transmitting the IR signals to the IR receiver 31.

Figure 3:
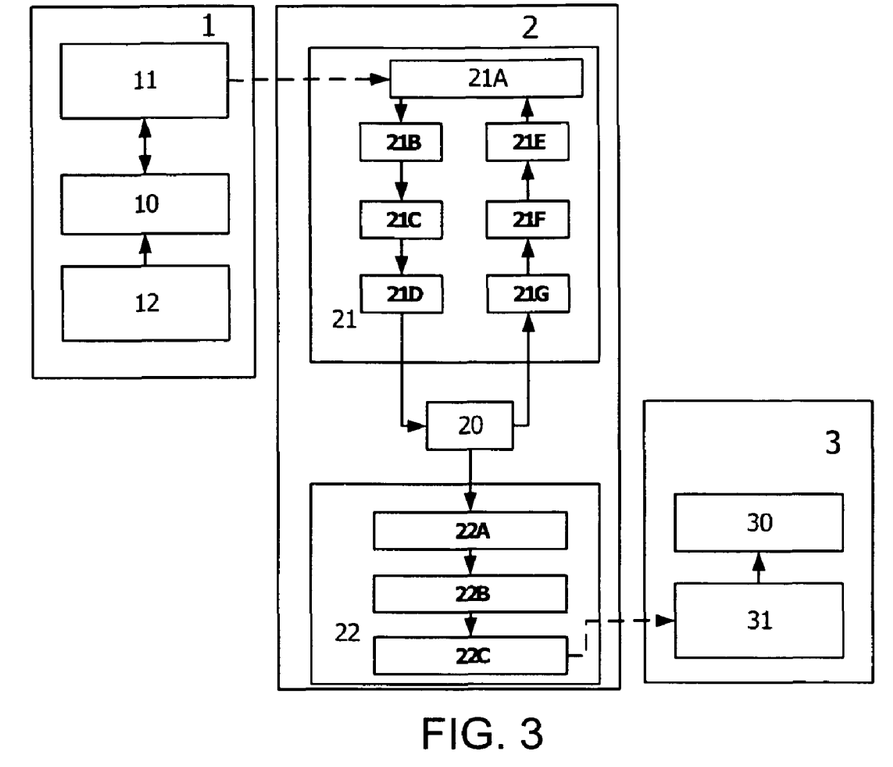
FIG. 3 is another block diagram of FIG. 1 with a second configuration of the retransmission device of the remote control system being shown in detail.

Referring to FIG. 3 specifically, a second configuration of the retransmission device 2 is shown. The second RF unit 21 comprises an antenna 21A, for receiving RF signals transmitted from the first RF unit 11 and transmit acknowledgement RF signals to the first RF unit 11, a low noise amplifier 21B for amplifying the received RF signals, a down converter 21C for processing the RF signals, and a demodulator 21D for demodulating the converted RF signals and transmit the demodulated RF signals to the third processor 20, a modulator 21 G for modulating acknowledgement signals from the third processor 20, an up converter 21 F for converting the acknowledgement signals to desire RF band, a power amplifier 21 E for amplifying the converted acknowledgement signals then transmit the amplified acknowledgement signals to the antenna 21A. The third processor 20 processes the demodulated RF signals into IR signals. The IR unit 22 comprises an encoder 22A for encoding the IR signals into one of a plurality of forms such as one including a guide code, a user code, and a control code, an amplifier 22B for amplifying the encoded IR signals, and an IR LED 22C for transmitting the IR signals to the IR receiver 31.

The characteristic of the second configuration of the retransmission device 2 is detailed below. The retransmission device 2 may send an acknowledgement (ACK) signal or ACK code back to the RC 1 in a predetermined period of time in response to receiving a control signal sent from the RC 1. In detail, the third processor 20 may send the ACK signal or code back to the RC 1 via the modulator unit 21G, the up converter 21F, the power amplifier 21E, and the antenna 21A. Thus, the RC 1 can confirm that the previously sent signal has been safely received by the retransmission device 2. To the contrary, the RC 1 may retransmit the control signal to the retransmission device 2 if the desired ACK signal or code is not received after the predetermined period of time has expired. Further, the above retransmission may repeat a predetermined number of times in order to ensure that the control signal has been safely received.

Figure 4:
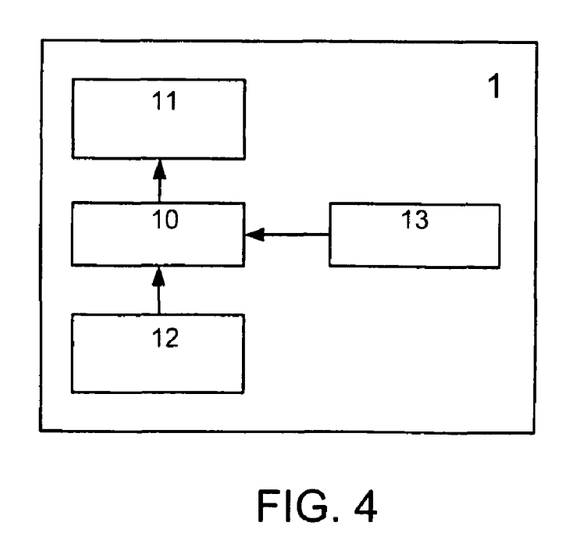
FIG. 4 is a block diagram of the remote control of FIG. 1 in operation.
Figure 5:
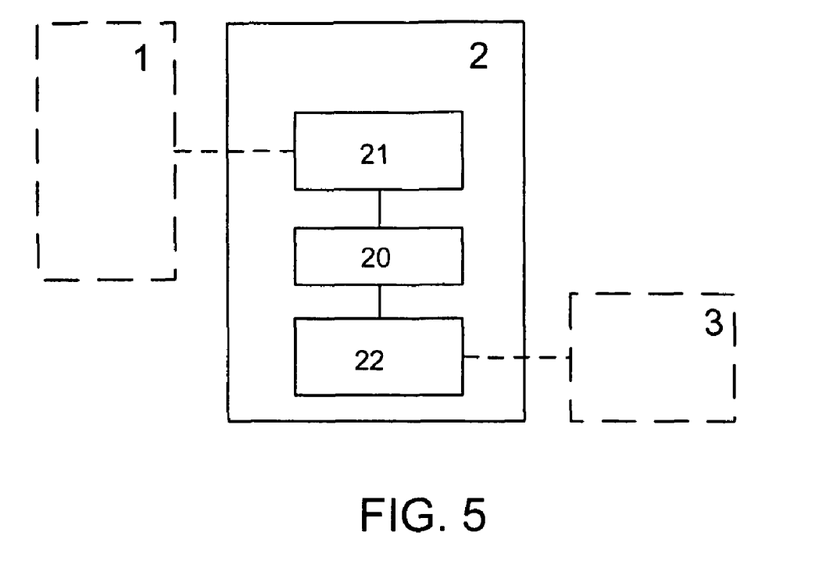
FIG. 5 is a simplified block diagram of FIG. 1.

Referring to FIG. 4 specifically, the first processor 10 may compare temperature measured by the temperature sensor 13 (i.e., real indoor temperature) with a predetermined temperature of the air conditioner set by a user. The first processor 10 may send a temperature value to the first RF unit 11 or send a temperature increase instruction to the first RF unit 11 if the real indoor temperature is lower than the predetermined temperature (i.e., indoor being relatively cold). Alternatively, the first processor 10 may send a temperature decrease instruction to the first RF unit 11 if the real indoor temperature is higher than the predetermined temperature (i.e., indoor being relatively hot). The value of the predetermined temperature is stored in the first processor 10.

It is noted that the temperature value, the temperature increase instruction, and the temperature decrease instruction can be referred to as temperature parameters.

It is understood that an RC user is located at a position different from that of the air conditioner. Hence, temperature around the user and that of the air conditioner are different. The air conditioner may increase or decrease its cooling air output for adjustment in response to temperature measured by a temperature sensor thereof. Hence, the temperature control feature of the air conditioner may be compromised if the temperature difference between the room temperature and the temperature measured by the air conditioner is sufficiently large. That is, an optimum indoor temperature can not be obtained and thus persons may not feel comfortable when staying in a room equipped with the air conditioner. It is also understood that temperature of RC and temperature surrounding an RC user are generally the same.

In view of the above facts it is envisaged by the invention that the RC is adapted to measure temperature surrounding a user and the measured temperature is further used for temperature adjustment of the air conditioner. A user may operate the RC to send a temperature adjustment signal to the air conditioner based on the measured temperature surrounding the user. As a result, an optimum indoor temperature is obtained by the invention.

Preferably, operating radio frequency of the first RF unit 11 is 2.4 GHz band which is also the operating radio frequency of the second RF unit 21. However, other radio operating frequencies are possible. For example, operating radio frequency is 433 MHz band in other embodiments. Note that the IR unit 22 and the IR receiver 31 are aligned. The effective distance between the RC 1 and the retransmission device 2 is decided by the manufacturers.

Figure 6:
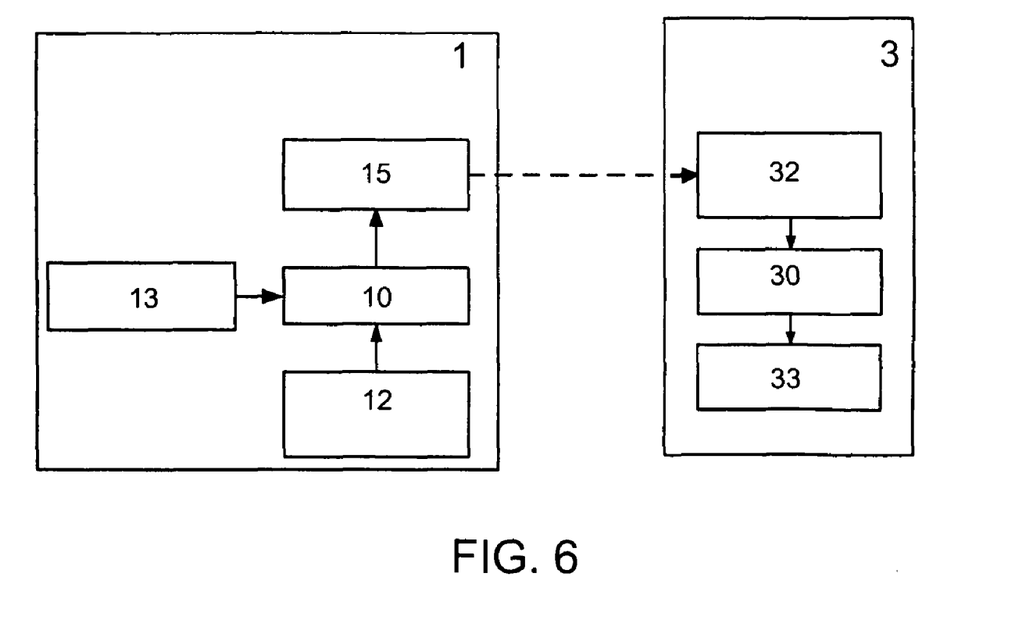
FIG. 6 is a block diagram of a remote control system for an air conditioner according to a second preferred embodiment of the invention.

Referring to FIG. 6, a remote control system for an air conditioner in accordance with a second preferred embodiment of the invention is shown. The characteristics of the second preferred embodiment are detailed below. The remote control system comprises an RC 1 and a receiver 3.

Figure 7A:
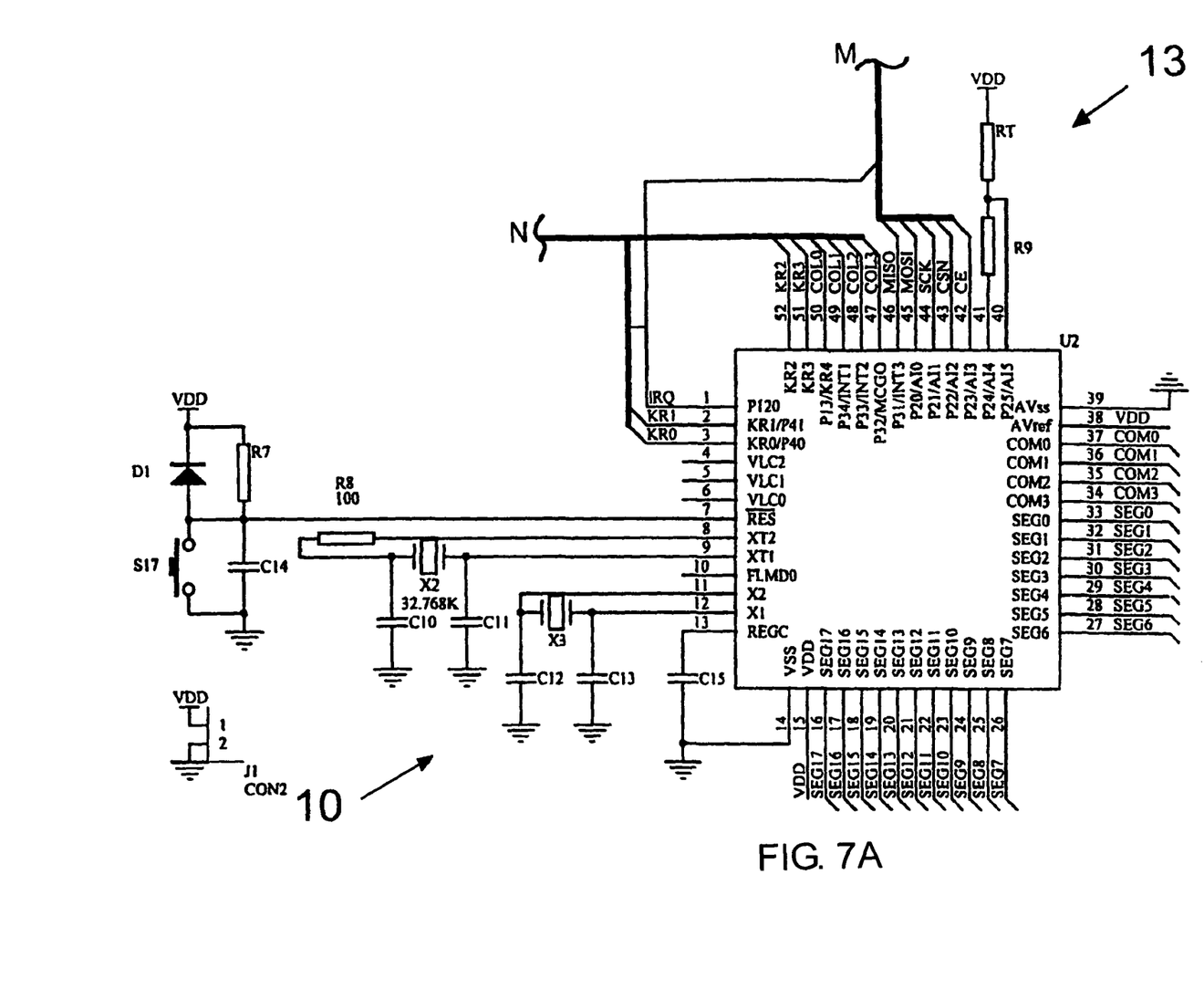
FIGS. 7A, 7B, 7C, and 7D are detailed circuit diagrams of the first processor, first RF unit, keypad, and LCD display of the remote control of FIG. 1 respectively.
Figure 7B:
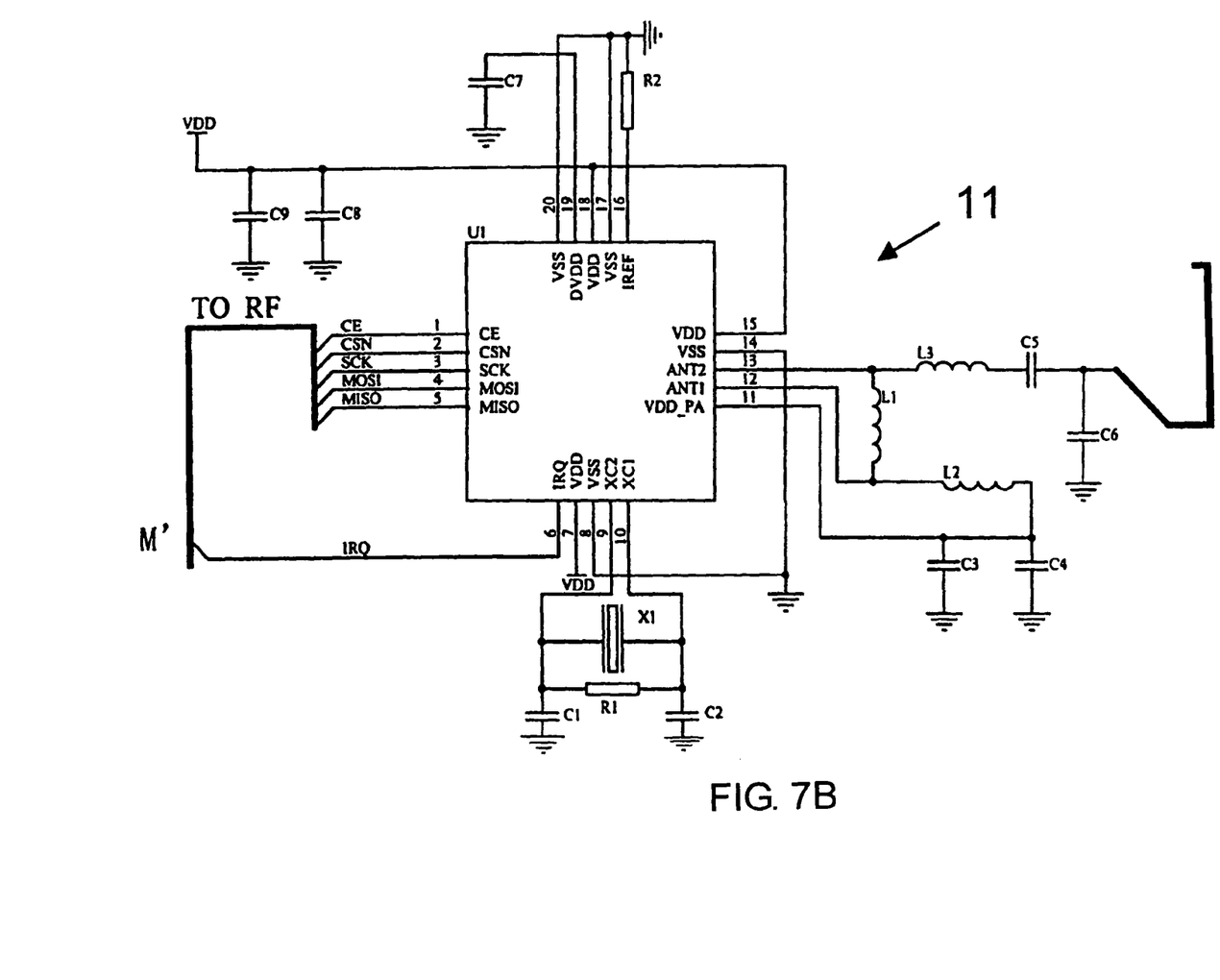
Figure 7C:
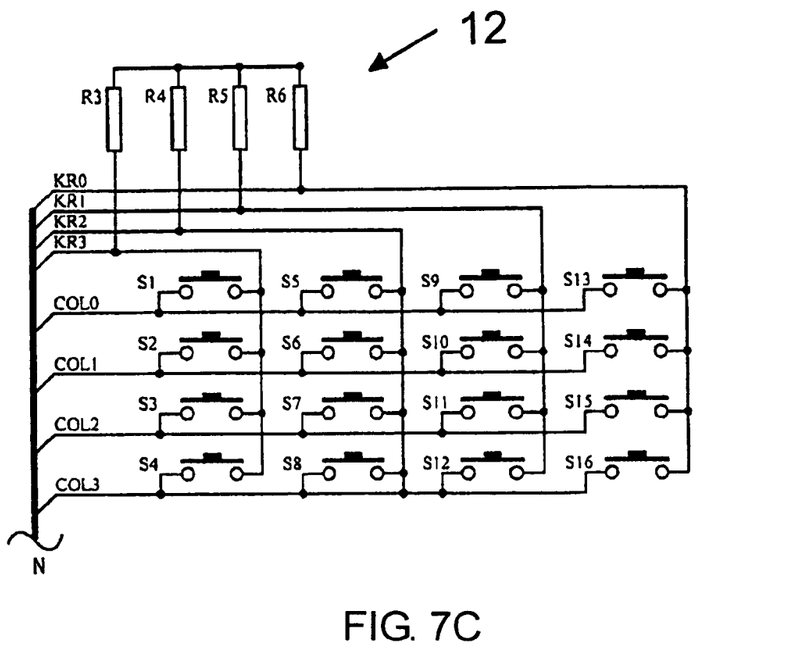
Figure 7D:
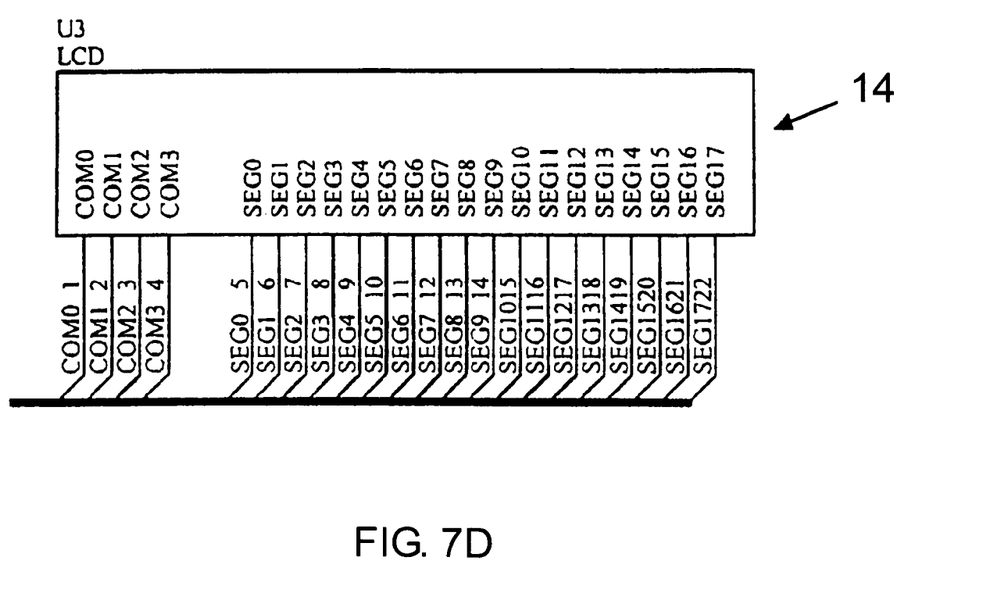

The RC 1 comprises a first processor 10, an RF unit 15, a keypad 12, a temperature sensor 13, and an LCD display 14 (see FIG. 7D). The receiver 3 comprises an RF unit 32, a second processor 30, and a master processing unit 33. The receiver 3 is mounted on the front surface of the air conditioner. The RF unit 15 is adapted to communicate to the RF unit 32 via RF signals.

The first processor 10 may compare temperature measured by the temperature sensor 13 (i.e., real indoor temperature) with a predetermined temperature of the air conditioner set by a user. The first processor 10 may send a temperature value to the first RF unit 15 or send a temperature increase instruction to the RF unit 15 if the real indoor temperature is lower than the predetermined temperature (i.e., indoor being relatively cold). Alternatively, the first processor 10 may send a temperature decrease instruction to the RF unit 15 if the real indoor temperature is higher than the predetermined temperature (i.e., indoor being relatively hot). And in turn, the RF unit 15 transmits the temperature value or temperature increase or decrease instruction to the RF unit 32 via RF signals.

The second processor 30 processes the temperature value or temperature adjustment instruction received from the RF unit 32 into corresponding IR format data. The corresponding IR format data are in turn sent to the master processing unit 33. Finally, the master processing unit 33 may perform a temperature adjustment of the air conditioner in response to the instruction. Alternatively, the second processor 30 may send the RF signals carrying temperature value or temperature adjustment instruction to the master processing unit 33 if RF signals/data to IR signals/data conversion is not required.

The retransmission device is eliminated in the second preferred embodiment. The RC 1 communicates with the receiver 3 via RF signals. Hence, only the IR receiver of a typical air conditioner is required to be replaced with the receiver 3 of the invention plus the purchase of the RC 1 of the invention. Fortunately, the replacement and purchase cost is relatively low. Thus, it is still cost effective.

Alternatively, IR signals are not involved in the communication between the RC 1 and the receiver 3 since RF signals/data to IR signals/data conversion is not required, in this condition, the second processor 30 and master processing unit 33 can be combined to one processor, the master processing unit 33 will control the RF unit 32 directly and the second processor 30 can be saved.

Referring to FIGS. 7A-7D and 8, the main components of the remote control of FIG. 1 are shown. Bus M of the first processor 10 in FIG. 7A is connected to bus M' of first RF unit 11 in FIG. 7B. Bus N of the first processor 10 in FIG. 7A is connected to bus N' of the keypad 12 in FIG. 7C. The keypad 12 comprises key pressing switches S1-S16. The first processor 10 comprises a frequency divider, a timer, a controller, and a key pressing scanning circuit. One of the key pressing switches S1-S16 is adapted to send an address code to the register of the first processor 10 in response to a key pressing thereon. Thus, the first processor 10 may process same to issue a corresponding instruction to the first RF unit 11. And in turn, the first RF unit 11 encodes the instruction and transforms same into an RF signal. Finally, the RF signal is transmitted via the antenna 21A.

Figure 8:
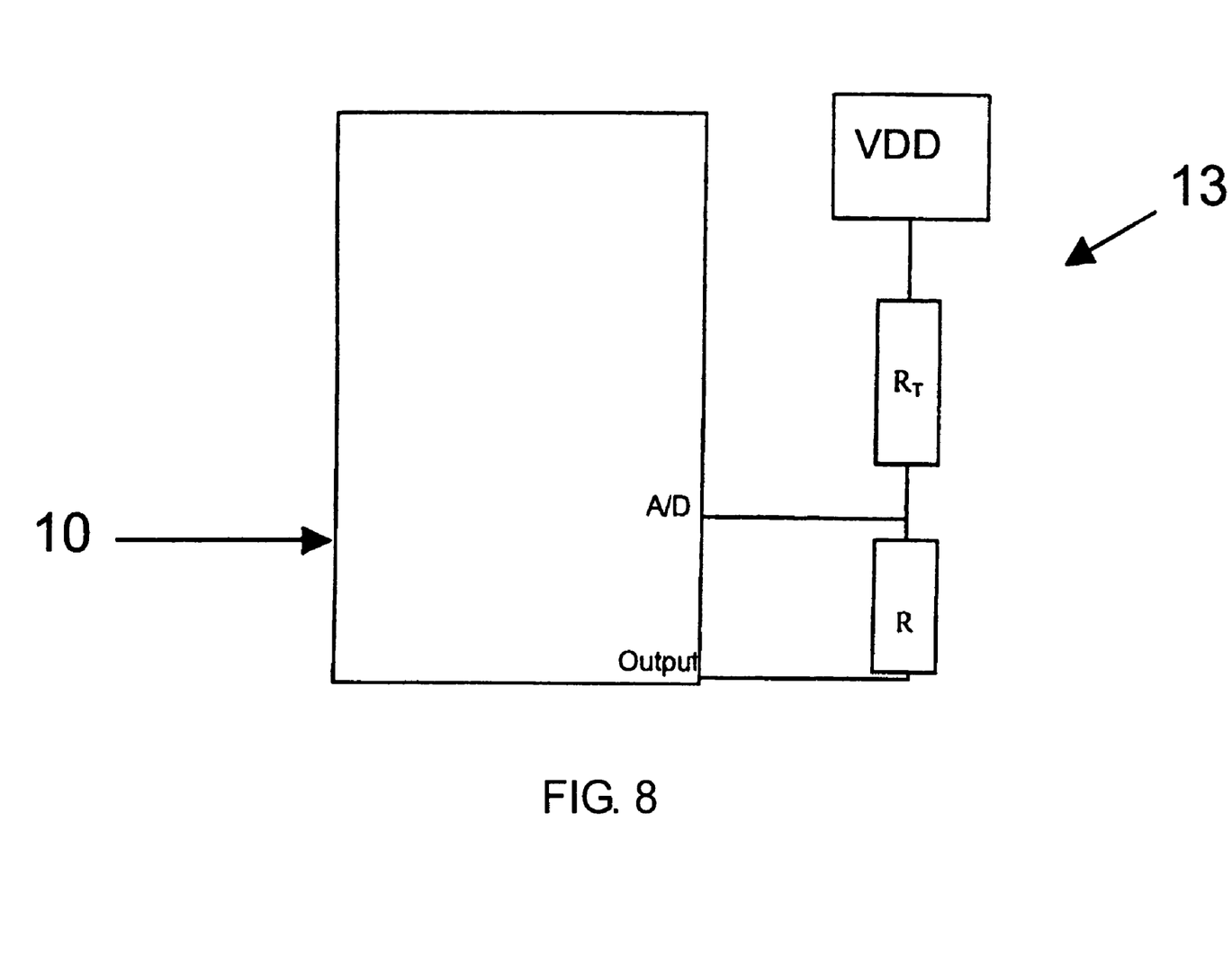
FIG. 8 is a block diagram of the temperature sensor of FIG. 7A.

Referring to FIGS. 7A and 8 specifically, the temperature sensor 13 comprises a thermistor $R_T$ and a resistor R connected in series thereto. The thermistor $R_T$ has one end connected to a voltage source VDD and the other end connected to one end of the resistor R. One end of the resistor R is also connected to the A/D (analog to digital converter) port of the first processor 10. The other end of the resistor R is connected to the output port of the first processor 10.

Resistance of the thermistor $R_T$ is inversely proportional to its temperature. Hence, voltage across the thermistor $R_T$ changes (i.e., decreases) in response to ambient temperature change (e.g., increase). The analog voltage value measured at a joining point of the thermistor $R_T$ and the resistor R is fed to the A/D port for converting into a digital representation of the voltage. And in turn, the digital representation of the voltage is transformed into a corresponding temperature which is taken as the measured temperature of the temperature sensor 13 by the first processor 10. Thus, the first processor 10 may activate to adjust the temperature setting of the air conditioner by outputting a low level on its output port. To the contrary, if there is no change with respect to the voltage across the thermistor $R_T$ (i.e., indoor temperature is within the range of set temperature) the first processor 10 may not activate to adjust the temperature setting of the air conditioner by outputting a high level on its output port. The above two conditions are results when a person presses a key of the RC 1 to measure indoor temperature. In short, the first processor 10 compares the temperature measured by the temperature sensor 13 with the set temperature of the air conditioner. Further, the first processor 10 may perform a temperature adjustment operation of the air conditioner if such need arises. Note that the temperature adjustment instruction of the first processor 10 is transmitted via the first RF unit 11. It is further noted that the LCD display 14 is used to show operating conditions and various settings of the remote control system.

The RC 1 may be programmed to measure indoor temperature regularly (i.e., measuring indoor temperature one or more times everyday) so as to always maintain indoor temperature at an optimum one. Moreover, the set temperature of the air conditioner may be changed as a temperature range.

While the invention herein disclosed has been described by means of specific embodiments, numerous modifications and variations could be made thereto by those skilled in the art without departing from the scope and spirit of the invention set forth in the claims.

What is claimed is:
1. A remote control system comprising:
a wireless handheld RC (1) comprising a first processor (10), a keypad (12), a temperature sensor (13), and an RF unit (15); and
a receiver (3) mounted on an air conditioner and comprising an RF unit (32), a second processor (30), and a master processing unit (33),
wherein the first processor (10) compares temperature measured by the temperature sensor (13) with a set temperature of the air conditioner, the first processor (10) sends a temperature value to the RF unit (15) or a temperature adjustment instruction to the RF unit (15) if the measured temperature is not within a predetermined range of the set temperature, the RF unit (15) transmits the temperature value or the temperature adjustment instruction to the RF unit (32) via RF signals, the second processor (30) receives the RF signals from the RF unit (32), and the second processor (30) either (i) converts the RF signals into IR signals with RF data being converted into corresponding IR data such that the master processing unit (33) receives the IR signals from the second processor (30) and performs a temperature adjustment of the air conditioner if there is a sending of the temperature adjustment instruction to the RF unit (15) or (ii) sends the RF signals to the master processing unit (33);
wherein the temperature sensor (13) comprises a thermistor and a resistor, the thermistor having one end connected to a voltage source and the other end connected to one end of the resistor, one end of the resistor connected to an A/D (analog to digital converter) port of the first processor (10) and the other end thereof being connected to an output port of the first processor (10);
wherein an analog voltage measured at a joining point of the thermistor and the resistor is fed to the A/D port to convert into a digital representation of the voltage, and the digital representation of the voltage is transformed into a corresponding temperature value representing the measured temperature of the temperature sensor (13) by the first processor (10);
wherein the first processor (10) activates to adjust the set temperature by outputting a low level on its output port if the measured temperature is not within the predetermined range of the set temperature; and
wherein the first processor (10) issues a high level on its output port to stop supplying current to the resistor if the measured temperature is within the predetermined range of the set temperature.

* * * * *